United States Patent
Wieclawski

(10) Patent No.: US 7,971,938 B2
(45) Date of Patent: Jul. 5, 2011

(54) VEHICLE SEAT ASSEMBLY

(75) Inventor: Stanislaw Andrzej Wieclawski, Hohenkammer (DE)

(73) Assignee: Lear Corporation, Southfield, MI (US)

( * ) Notice: Subject to any disclaimer, the term of this patent is extended or adjusted under 35 U.S.C. 154(b) by 247 days.

(21) Appl. No.: 12/277,535

(22) Filed: Nov. 25, 2008

(65) Prior Publication Data

US 2009/0195044 A1 Aug. 6, 2009

(30) Foreign Application Priority Data

Jan. 31, 2008 (DE) .......................... 10 2008 006 980

(51) Int. Cl.
*B60N 2/02* (2006.01)
(52) U.S. Cl. .................. 297/378.12; 297/311; 297/340; 297/341; 297/342; 297/362.12
(58) Field of Classification Search ............. 297/378.12, 297/311, 340, 341, 342, 362.12, 378.14, 297/378.1, 367
See application file for complete search history.

(56) References Cited

U.S. PATENT DOCUMENTS

| | | | |
|---|---|---|---|
| 5,653,506 A | 8/1997 | Wisner et al. | |
| 5,660,440 A | 8/1997 | Pejathaya | |
| 5,695,247 A * | 12/1997 | Premji | ........................ 297/341 |
| 5,765,916 A | 6/1998 | Patel | |
| 5,769,493 A | 6/1998 | Pejathaya | |
| 5,788,330 A | 8/1998 | Ryan | |
| 5,979,986 A | 11/1999 | Pejathaya | |
| 6,345,867 B1 | 2/2002 | Hellrung et al. | |
| 6,513,868 B1 | 2/2003 | Tame | |
| 6,659,557 B2 * | 12/2003 | Deptolla | .................... 297/367 R |
| 6,733,076 B2 | 5/2004 | Grable et al. | |
| 6,789,849 B2 | 9/2004 | Gray | |
| 6,830,296 B2 | 12/2004 | Kojima | |
| 6,860,562 B2 * | 3/2005 | Bonk | ....................... 297/378.12 |
| 6,945,607 B2 | 9/2005 | Kojima | |
| 7,017,995 B2 | 3/2006 | De Nichilo | |
| 7,021,716 B2 * | 4/2006 | Persad et al. | ............ 297/378.12 |
| 7,036,885 B2 * | 5/2006 | Ganot et al. | ............ 297/378.12 |

(Continued)

FOREIGN PATENT DOCUMENTS

DE 102004002144 A1 8/2005

OTHER PUBLICATIONS

English Abstract of DE102004002144A1.

(Continued)

*Primary Examiner* — Laurie K Cranmer
(74) *Attorney, Agent, or Firm* — Brooks Kushman P.C.

(57) ABSTRACT

A vehicle seat assembly adapted to perform an easy entry function includes a seat body having a seat bottom and a pivotally connected seat back. The seat body is configured to limit the seat back to pivot through a first angular range that inhibits the seat back from actuating the easy entry function. The seat body is further configured to limit the seat back to pivot through a second angular range that allows the seat back to actuate the easy entry function. The first actuator is provided to actuate the seat back to pivot through the first angular range. A second actuator is provided to actuate the seat back to pivot through the second angular range. The seat back maintains a generally upright orientation as the seat back pivots in a forward direction through the first angular range and the second angular range.

20 Claims, 5 Drawing Sheets

U.S. PATENT DOCUMENTS

| | | | |
|---|---|---|---|
| 7,195,316 | B2 | 3/2007 | Shimasaki et al. |
| 7,255,398 | B2 * | 8/2007 | Tokui et al. ............... 297/367 R |
| 7,434,883 | B2 * | 10/2008 | Deptolla ...................... 297/341 |
| 7,533,937 | B2 * | 5/2009 | Becker et al. ............ 297/378.14 |
| 7,819,479 | B2 * | 10/2010 | Halbig et al. ............ 297/378.14 |
| 2002/0135215 | A1 | 9/2002 | Magyar et al. |
| 2004/0021355 | A1 * | 2/2004 | Ohba ........................... 297/341 |
| 2004/0090102 | A1 * | 5/2004 | Tame et al. ............. 297/378.12 |
| 2004/0239168 | A1 * | 12/2004 | Persad et al. ............... 297/378.1 |
| 2004/0262969 | A1 * | 12/2004 | Sasaki et al. ............. 297/344.11 |
| 2005/0046261 | A1 * | 3/2005 | Grable et al. ............. 297/378.1 |

OTHER PUBLICATIONS

Office Action from German Patent and Trademark Office listing above—cited German reference, dated Nov. 24, 2008, 4 pages.

* cited by examiner

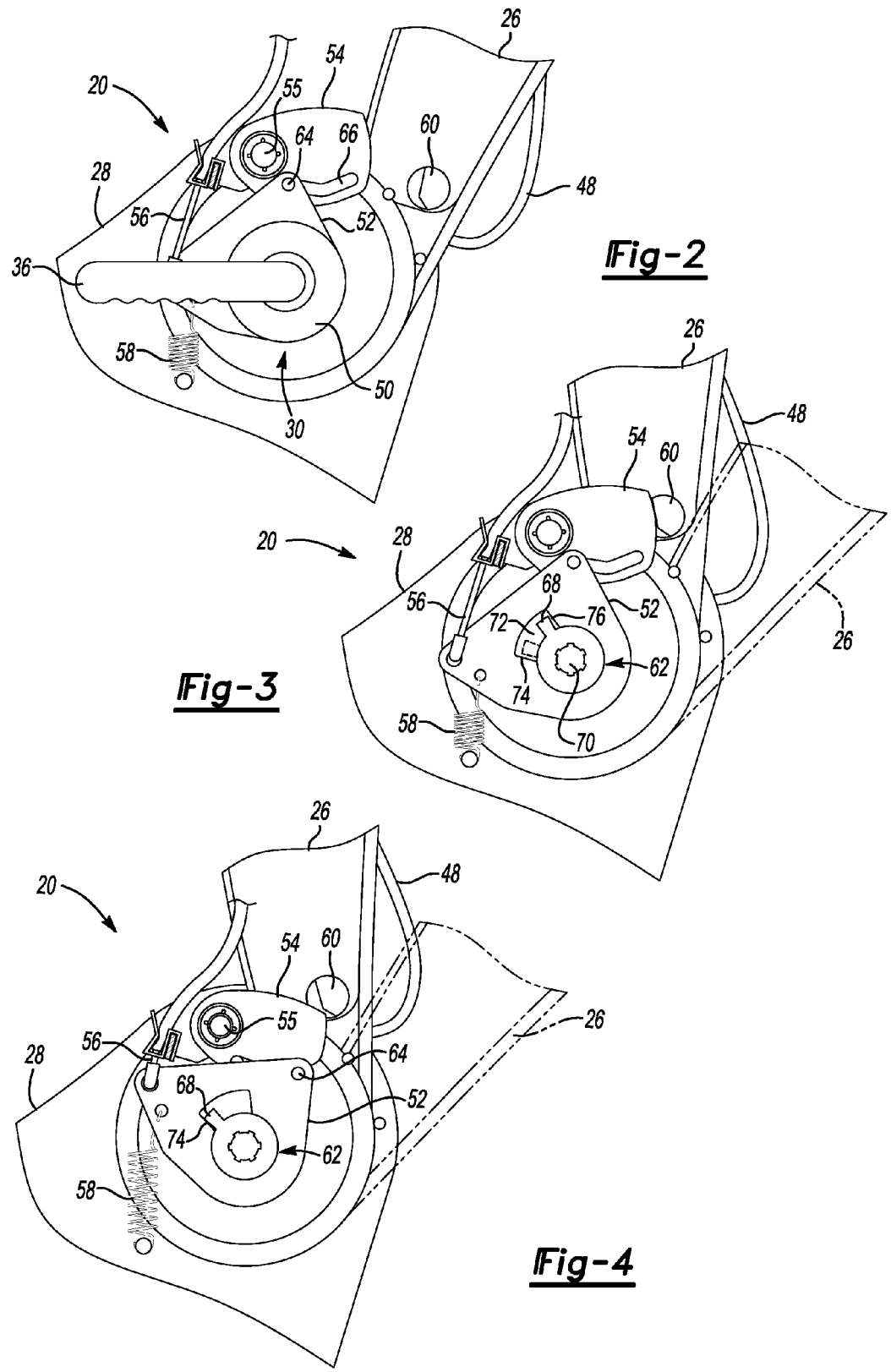

VEHICLE SEAT ASSEMBLY

CROSS-REFERENCE TO RELATED APPLICATIONS

This application claims foreign priority benefits under 35 U.S.C. §119(a)-(d) to DE 10 2008 006 980.9, filed Jan. 31, 2008, which is hereby incorporated by reference in its entirety.

BACKGROUND OF THE INVENTION

1. Field of the Invention

A vehicle seat assembly adapted to perform an easy entry function is disclosed herein. The seat assembly includes two actuators for actuating the seat back to pivot through one of two different, generally upright pivot ranges. A first pivot range permits the seat back to pivot to a position that triggers the seat assembly's easy entry function, while the second range does not.

2. Background Art

A vehicle seat assembly having a pivotable seat back is disclosed herein. Examples of vehicle seats having pivotal seat backs include U.S. Pat. Nos. 5,660,440, 5,769,493, 5,788,330, 5,979,986, 6,513,868, 6,830,296, 6,945,607, and 7,021,716.

SUMMARY OF THE INVENTION

A vehicle seat assembly is disclosed herein. In a first embodiment, the vehicle seat assembly is adapted to perform an easy entry function. The vehicle seat assembly includes a seat body adapted to be mounted in a vehicle. The seat body has a seat bottom and a seat back that is pivotally connected to the seat bottom. The seat body is configured to limit the seat back to pivot through a first angular range that does not permit the seat back to actuate the easy entry function. The seat body is further configured to limit the seat back to pivot through a second angular range that does permit the seat back to actuate the easy entry function. The seat assembly also includes a first actuator for actuating the seat back to pivot through the first angular range and a second actuator for actuating the seat back to pivot through the second angular range. The seat back maintains a generally upright orientation as the seat back pivots in a forward direction through the first angular range and the second angular range.

In at least one implementation of the first embodiment, the first angular range is a subset of the second angular range. In at least on variation of this implementation, the second angular range has a forward limit that exceeds a forward limit of the first angular range.

In at least another implementation of the first embodiment, the vehicle seat assembly further includes a pair of rails for slidably mounting the seat body to a vehicle. The vehicle seat assembly also includes a slide lock mechanism for selectively locking and unlocking the rails to slide. The seat body is configured to release the slide lock mechanism from the locked state when the seat back pivots forward past a predetermined angular position with respect to the seat bottom. The predetermined angular position is outside of the first angular range and within the second angular range. In at least one variation of this implementation, the seat body is further configured to permit the rails to return to the locked position when the seat back pivots rearward past the predetermined angular position. In another variation of this implementation, the seat body includes a retaining member that precludes the rails from returning to the locked state until the seat back pivots rearward beyond the predetermined angular position to a second predetermined angular position.

In at least another implementation of the first embodiment, the vehicle seat assembly further includes a switch that is disposed on the seat body at a location that is spaced apart from the second actuator. The switch is connected to the second actuator and is configured to remotely actuate the second actuator.

In a second embodiment, a vehicle seat assembly that is adapted to perform an easy entry function includes a seat body having a seat bottom and a seat back that is configured to pivot with respect to the seat bottom. The seat body is configured to selectively lock and unlock pivot movement of the seat back. A blocking member is positioned proximate the seat body. The blocking member is configured to move between a first position that obstructs the seat back from pivoting in a forward direction beyond a predetermined point, and a second position that does not obstruct the seat back from pivoting in the forward direction. A first actuator is connected to the seat body and configured to unlock the seat back to pivot when actuated without moving the blocking member to the second position. A second actuator is connected to the seat body and to the blocking member. The second actuator is configured to unlock the seat back to pivot and also to move the blocking member to the second position when the second actuator is actuated. The easy entry function of the vehicle seat assembly is triggered when the seat back pivots forward of the predetermined point. The blocking member inhibits the seat back from pivoting forward beyond the predetermined point when the first actuator is actuated. The seat back is free to pivot forward beyond a predetermined point when the second actuator is actuated.

In at least one implementation of the second embodiment, a channel is defined in the blocking member. The second actuator includes a protrusion that protrudes into the channel. The protrusion moves along the channel and pushes on a wall of the channel to move the blocking member from the first position to the second position when the second actuator is actuated. In a variation of this implementation, the second actuator includes a biasing member that urges the second actuator towards a non-actuated state and the second actuator biases the blocking member towards the first position when the second actuator is in the non-actuated state through engagement between the protrusion and the channel. In a further variation, the blocking member is a first blocking member and the seat back also includes a second blocking member. The first blocking member is configured to obstruct the second blocking member and to inhibit the seat back from pivoting forward beyond the predetermined point while the first blocking member is in the first position. In a further variation, the second blocking member can obstruct the first blocking member from returning to the first position when the seat back pivots forward beyond the predetermined point and wherein the first blocking member retains the second actuator in an actuated state through engagement between the channel and the protrusion while the first blocking member is in the second position.

In another implementation of the second embodiment, the vehicle seat assembly further includes a pair of rails for slidably mounting the seat body to a vehicle and a slide lock mechanism for locking and unlocking the rails to slide. The seat body is configured to release the slide lock mechanism from the locked state when the seat back pivots forward past a slide lock trigger point which is at least as far forward as the predetermined point.

In another implementation of the second embodiment, the second actuator includes a plate having a void to avoid obstructing operation of the first actuator when the first actuator unlocks the seat back to pivot.

In a third embodiment, a vehicle seat assembly that is adapted to perform an easy entry function includes a seat body having a seat bottom and a seat back having an engagement member. The seat back is configured to pivot with respect to the seat bottom. The seat body is configured to selectively lock and unlock pivotal movement of the seat back. A blocking member is positioned proximate the seat body. The blocking member is configured to move between a first position that engages the engagement member to obstruct the seat back from pivoting in a forward direction beyond a predetermined point, and a second position that does not obstruct the seat back from pivoting in a forward direction. The first actuator is connected to the seat body and is configured to unlock the seat back to pivot without moving the blocking member to the second position. A second actuator is connected to the seat body and also to the blocking member. A second actuator is configured to unlock the seat back to pivot and also to move the blocking member to the second position when the second actuator is actuated. The second actuator is further configured to remain in an actuated state until the blocking member returns to the first position. A retaining member is connected to the blocking member. The retaining member is configured to move between an extended position and a retracted position. A portion of the retaining member extends in a rearward direction beyond a rear end of the blocking member when the retaining member is in the extended position. The retaining member is configured to engage the engagement member and to inhibit the blocking member from returning to the first position when the engagement member is in the extended position and engaged with the engagement member. The easy entry function is actuated when the seat back pivots forward of the predetermined point. The blocking member inhibits the seat back from pivoting forward beyond the predetermined point when the first actuator is actuated. The seat back is free to pivot forward beyond the predetermined point when the second actuator is actuated. The second actuator is retained in an actuated state until the engagement member moves beyond a rear end of the retaining member when the retaining member is in the extended position.

In at least one implementation of the third embodiment, the retaining member defines a slot and the blocking member includes a protrusion slidably engaging the slot. The retaining member slides along the protrusion as the retaining member moves between the extended position and the retracted position. In one variation of this implementation, the blocking member has two of the protrusions. The protrusions are spaced apart and cooperate to inhibit the retaining member from rotating with respect to the blocking member.

In another implementation of the third embodiment, the vehicle seat assembly further includes a retaining member spring connected to the retaining member. The retaining member spring biases the retaining member towards the extended position. In a variation of this implementation, the vehicle seat assembly further includes a second actuator spring. The second actuator spring biases the second actuator towards a non-actuated state. In a further variation of this implementation, the vehicle seat assembly further includes a pair of rails for slidably mounting the seat body to a vehicle. The vehicle seat assembly also includes a slide lock mechanism for locking and unlocking the rails to slide. The seat body is configured to release the slide lock mechanism from the locked state when the seat back pivots forward past a slide lock trigger point which is at least as far forward as the predetermined point.

BRIEF DESCRIPTION OF THE DRAWINGS

The description herein makes reference to the accompanying drawing wherein like reference numerals refer to like parts through the several views, and in which:

FIGS. 2-6 are fragmentary plan views of an outboard portion of the vehicle seat assembly of FIG. 1 depicting various components of a pivot actuation mechanism in various stages of actuation;

DETAILED DESCRIPTION OF THE PREFERRED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
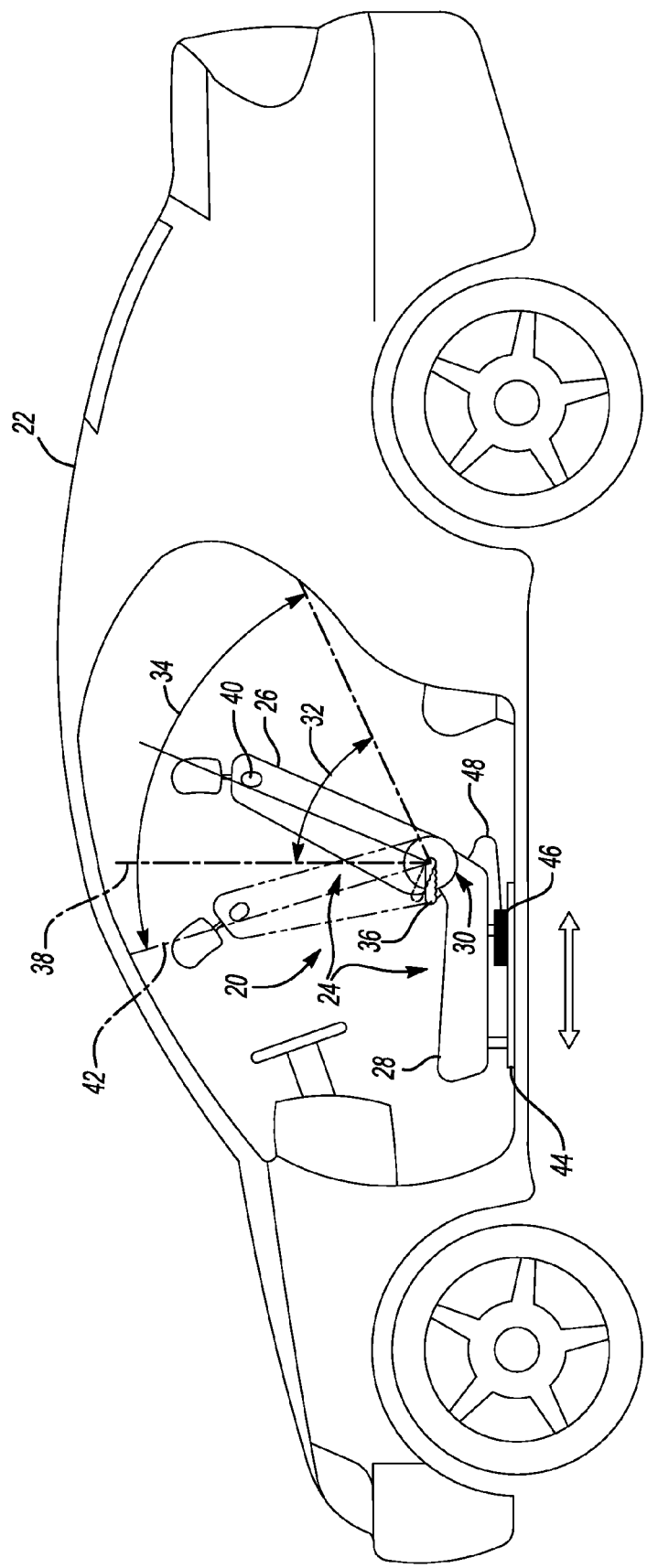
FIG. 1 is a schematic view of a vehicle equipped with an embodiment of the vehicle seat assembly of the present invention.

A vehicle seat assembly is disclosed herein. An embodiment of the vehicle seat assembly of the present invention is illustrated in FIG. 1. In FIG. 1, the vehicle seat assembly 20 is mounted to a vehicle 22. Although vehicle 22 is depicted as a passenger car, it should be understood that vehicle seat assembly 20 may be used in any type of vehicle including, but not limited to, sedans, coupes, wagons, minivans, sport utility vehicles and cross over vehicles. Each of these types of vehicles may use vehicle seat assemblies such as vehicle seat assembly 20 that are configured to perform an "easy entry" function. As used herein, the term "easy entry" shall refer to the function performed by vehicle seat assemblies wherein the seat back of the vehicle seat assembly pivots partially forward, usually forward of a perpendicular orientation, to allow a person to enter the vehicle rearward of the vehicle seat assembly. Vehicle seat assemblies capable of performing the "easy entry" function are slidably mounted to the vehicle. The forward pivoting action of the seat back releases the vehicle seat assembly to slide forward along its mount. In many conventional vehicle seat assemblies, a handle is provided to allow a user to adjust the angle of the seat back. Typically, pulling up on the handle will cause the vehicle seat back to pivot forward under the urging of some biasing means such as a spring. Such vehicle seat assemblies may inadvertently trigger actuation of the easy entry function and cause the seat to slide forward. Thus, it is desirable to have a reclining mechanism that permits a user to adjust the angle of the seat back within a "comfort range" but which is incapable of inadvertently triggering the vehicle seat assembly's easy entry function. The vehicle seat assembly of the present invention addresses this problem. The vehicle seat assembly 20 includes a vehicle seat body 24 including a seat back 26 and a seat bottom 28. Seat back 26 is pivotally connected to seat bottom 28. A pivot actuation mechanism 30 controls pivoting of the seat back with respect to the seat bottom. Various embodiments of the pivot actuation mechanism 30 are illustrated in FIGS. 2-9.

Seat body 24 is configured to permit seat back 26 to pivot and/or recline through both a first or comfort pivot range 32 and a second or easy entry pivot range 34. The first or comfort pivot range 32 generally includes all angular ranges of the seat back that a seat occupant may select for comfort while seated in vehicle seat assembly 20. Such ranges typically include angles as far forward as perpendicular and as far rearward as substantially horizontal. In some instances, a seat occupant may select a forward angle that is forward of the perpendicular orientation of seat back 26 with respect to seat bottom 28. Comfort pivot range 32 will not, however, include angles of seat back 26 that are far enough forward to trigger the easy entry function of vehicle seat assembly 20. The second or easy entry pivot range may include the entire comfort range but will also include angular orientations of the seat back that are forward of the forward limit of the comfort range. In some embodiments, the first or comfort pivot range will be a subset of the second or easy entry pivot range. In other embodiments, the comfort pivot range will not be a subset of the easy entry pivot range, but rather, the comfort pivot range and the easy entry pivot range will cover generally different pivot angles of seat back 26 with respect to seat bottom 28, but a portion of the two ranges will overlap. In other embodiments, the two ranges do not over lap. Rather, the first or comfort pivot range may end where the second or easy entry pivot range begins and vice versa. While the easy entry pivot range generally includes angles forward of a perpendicular orientation, it does not include seat back angles that are horizontal or substantially horizontal. As used herein, the term "forward" is intended to refer to the direction of vehicle travel as the vehicle moves forward. The term "rearward" refers to the direction opposite to the direction of forward vehicle travel. In both the first and the second pivot ranges 32,34, seat back 26 maintains a generally upright orientation as seat back 26 pivots forward.

In FIG. 1, seat back 26 is illustrated in solid lines in its design position. As used herein, the term "design position" shall refer to a predetermined angle of recline of seat back 26 that is deemed optimal for driving, although an occupant of vehicle seat assembly 20 may recline seat back 26 forward of, or rearward of, the design position to suit their personal preferences. The design position for seat back 26 falls within both the comfort and easy entry pivot ranges 32, 34.

Handle 36 allows an occupant of vehicle seat assembly 20 to adjust seat back 26 throughout comfort pivot range 32. When an occupant lifts up on handle 36, seat back 26 is free to pivot with respect to seat bottom 28 within comfort pivot range 32. Pivot actuation mechanism 30 is configured to preclude seat back 26 from pivoting beyond a predetermined point 38, which represents a forward edge of the comfort pivot range 32, when pivotal movement of seat back 26 is actuated by handle 36.

Vehicle seat assembly 20 further includes a remote switch 40, mounted to an upper portion of seat back 26. Remote easy entry switch 40 allows a person to remotely actuate pivot actuation mechanism 30. When pivot actuation mechanism 30 is actuated using remote easy entry switch 40, pivot actuation mechanism 30 permits seat back 26 to pivot in a forward direction beyond predetermined point 38 to the forward edge 42 of easy entry pivot range 34. Vehicle seat assembly 20 includes a slide mount 44 which slidably mounts seat body 24 to vehicle 22, and slide lock mechanism 46 which selectively locks and unlocks slide mount 44 and alternately locks and frees seat body 24 to slide along slide mount 44. Slide lock mechanism cable 48 connects seat back 26 to slide lock mechanism 46. When seat back 26 pivots forward beyond predetermined point 38, seat back 26 pulls on slide lock mechanism cable 48 which releases slide lock mechanism 46 and frees seat body 24 to slide forward. In some embodiments, seat back 26 will release slide lock mechanism 46 as soon as seat back 26 passes predetermined point 38. In other embodiments, seat back 26 may need to pivot to forward edge 42 before the slide lock mechanism is released. In still other embodiments, seat back 26 will release slide lock mechanism 46 as seat back 26 pivots past some intermediate point disposed between predetermined point 38 and forward edge 42.

FIG. 2 is a plan, fragmentary view of a portion of vehicle seat assembly 20 including seat back 26, seat bottom 28 and pivot actuation mechanism 30. In FIG. 2, seat back 26 is disposed in the design position. Also illustrated in FIG. 2 are cover plate 50, handle or first actuator or comfort adjuster actuator 36, easy entry actuator or second actuator 52, blocking member 54, easy entry actuator cable 56, easy entry actuator spring 58 and second blocking member or engagement member 60. Cover plate 50 is a generally circular plate having a centrally disposed opening to permit handle 36 to engage pivot actuation mechanism 30. Cover plate 50 is provided for generally aesthetic purposes and will be excluded from FIGS. 3-9. Similarly, handle 36 will be excluded from FIGS. 3-9 to permit illustration of the workings of pivot actuation mechanism 30 without obstruction. It should be understood that, though not shown in FIGS. 3-9, it is intended that cover plate 50 and handle 36 are included in vehicle seat assembly 20 and are present during normal operations of pivot actuation mechanism 30. In the illustrated embodiment, easy entry actuator 52 and blocking member 54 are plates that are disposed adjacent to one another and are constructed of metal such as steel. It should be understood, however, that other materials, such as composites and/or polymeric materials, may be used in the fabrication of these components. Although depicted as plates, it should be understood that neither easy entry actuator 52 nor blocking member 54 are limited to plate-like structures but may take other forms as dictated by design requirements.

Easy entry actuator spring 58 has been illustrated as a coil spring. It should be understood that any type of biasing member may be employed.

Second blocking member or engagement member 60 has been illustrated as a generally cylindrical protrusion protruding in an outboard direction from seat back 26, with portions of the cylinder removed at various locations to provide a substantially flat engagement surface. It should be understood that, in other applications, other geometric configurations of second blocking member or engagement member 60 may be employed without deviating from the teachings of the present invention.

In FIG. 2, neither handle 36 nor easy entry actuator 52 have been actuated and seat back 26 resides in the design position. Handle 36 is configured to engage pivot lock mechanism 62 (see FIG. 3). Pivot lock mechanism 62 is configured to selectively lock and unlock seat back 26 to pivot with respect to seat bottom 28. Pulling up on handle 36 unlocks pivot lock mechanism 62 which will allow seat back 26 to pivot forward. Easy entry actuator 52 is also configured to engage pivot lock mechanism 62 (see FIGS. 3-10). Rotating easy entry actuator 52 in the clockwise direction (from the perspective of FIGS. 2-9) will rotate pivot lock mechanism 62 and permit seat back 26 to pivot forward. Easy entry actuator 52 further includes a pin or protrusion 64. Pin 64 extends outward from easy entry actuator 52 in an inboard direction. Blocking member 54 includes a blocking member slot 66 that extends along a length of blocking member 54. In some embodiments, blocking member slot 66 extends entirely through blocking member 54 while in other embodiments, blocking member slot 66 may comprise a channel defined in a surface of blocking member 54. Pin 64 extends into blocking member slot 66 and is configured to move longitudinally along blocking member slot 66 when easy entry actuator 52 is actuated.

Blocking member 54 pivots about blocking member pivot point 55 between a first or blocking position (as illustrated in FIG. 2) and a second or non-blocking position (as illustrated in FIG. 4). Easy entry actuator cable 56 is attached to easy entry actuator 52 at one end (see FIGS. 3-10) and is attached to remote switch 40 (see FIG. 1) at an opposite end. In the illustrated embodiment, easy entry actuator cable 56 is depicted as a Bowden cable. In other applications, other types of cables, tethers and/or linkages may be employed. Engagement member 60 projects in an outboard direction from seat back 26 and is positioned to engage blocking member 54 as seat back 26 pivots forward. Slide lock mechanism cable 48 is attached at one end to seat back 26 and connects to slide lock mechanism 46 (see FIG. 1) at an opposite end. As seat back 26 pivots forward, the slack in slide lock mechanism cable 48 is taken up. When seat back 26 pivots forward beyond a predetermined trigger point, slide lock mechanism cable 48 will release slide lock mechanism 46 and free vehicle seat assembly 20 to slide along slide mount 44.

FIG. 3 depicts the portion of vehicle seat assembly 20 illustrated in FIG. 2 after handle 36 has been pulled in an upward direction. FIG. 3 illustrates operation of pivot actuation mechanism 30 to permit seat back 26 to pivot throughout comfort range 32. While an operator continues to pull upwardly on handle 36, seat back 26 is free to pivot. As illustrated in FIG. 3, pivot lock mechanism 62 includes a finger 68 and an engagement opening or heart 70. Pivot lock mechanism 62 is configured to move between a locked position and a released position. When finger 68 is in the position indicated by phantom lines, pivot lock mechanism 62 is locked and seat back 26 is inhibited from pivoting with respect to seat bottom 28. When finger 68 is moved to the position illustrated in solid lines in FIG. 3, pivot lock mechanism 62 is released and seat back 26 is free to pivot with respect to seat bottom 28. Pivot lock mechanism 62 includes an engagement opening 70 disposed substantially coaxially with pivot lock mechanism 62. Handle 36 is configured to protrude within engagement opening 70 and is further configured to engage engagement opening 70 such that when an operator pulls up on handle 36, pivot lock mechanism 62 rotates in a clockwise direction (from the perspective of FIG. 3) to the released position. Easy entry actuator 52 includes a void or carve out 72. Void 72 is an opening defined in a surface of easy entry actuator 52 that extends therethrough. Void 72 is continuous with a pivot opening defined in easy entry actuator 52 and extending therethrough. The pivot opening is contoured to allow easy entry actuator 52 to pivot about pivot lock mechanism 62. Finger 68 projects into void 72. Accordingly, the pivot range of pivot lock mechanism 62 is limited by the lower and upper walls 74, 76 of void 72, but is free to rotate between those walls. Configured in this manner, a person may operate handle 36 and adjust seat back 26 to a desired angular orientation without disturbing easy entry actuator 52.

In FIG. 3, handle 36 (not shown) has been pulled up. Pivot lock mechanism 62 has rotated in a clockwise direction (from the perspective of FIG. 3), and finger 68 has moved from the position shown in phantom lines to the position shown in solid lines. Easy entry actuator 52 has not moved. Seat back 26 has moved from a reclined position (shown in phantom lines) to the predetermined point 38 (see FIG. 1) shown in solid lines. From this view, it can be seen that engagement member 60 has engaged blocking member 54. Blocking member 54 obstructs the path of engagement member 60 and, accordingly, seat back 26 is inhibited from pivoting in the forward direction beyond predetermined point 38. In this manner, a person may adjust seat back 26 throughout the comfort pivot range 32 using handle 36. As long as an operator continues to pull upwardly on handle 36, he or she is able to adjust seat back 26 throughout the full range of first or comfort pivot range 32.

Figure 5:
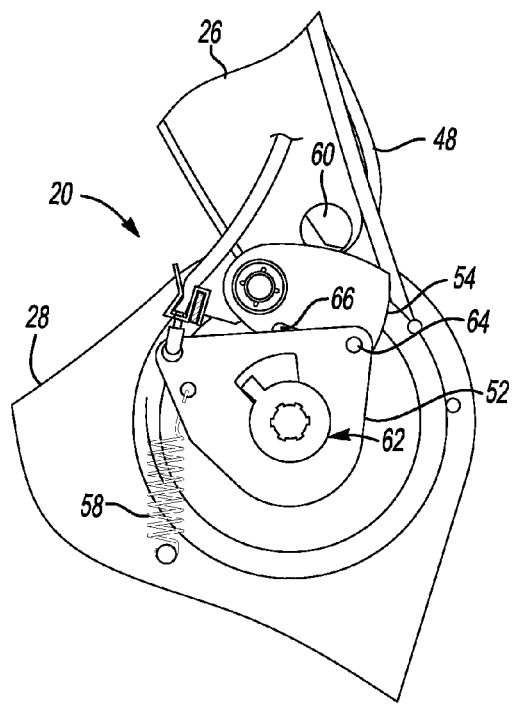
Figure 6:
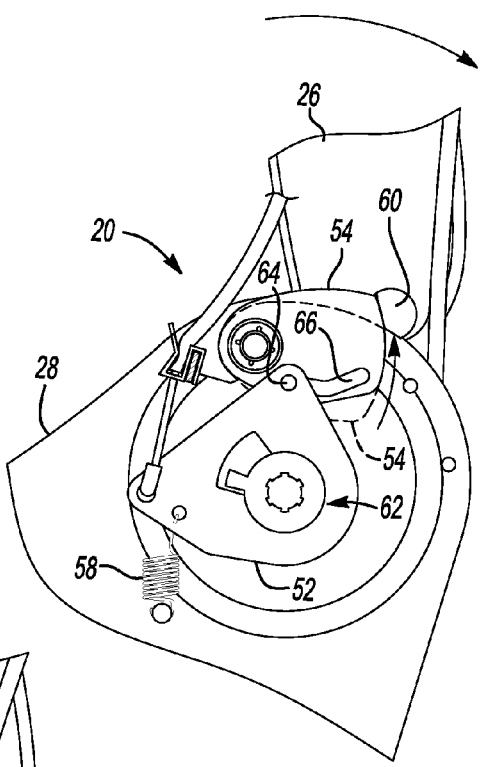

FIGS. 4-6 illustrate operation of the easy entry function of vehicle seat assembly 20. In FIG. 4, easy entry actuator cable 56 has been pulled with a force sufficient to overcome easy entry actuator spring 58 which biases easy entry actuator 52 towards a non-actuated state. As easy entry actuator cable 56 is pulled, it causes easy entry actuator 52 to pivot in a clockwise direction. As easy entry actuator 52 rotates clockwise, lower wall 74 engages finger 68 and causes pivot lock mechanism 62 to pivot in a clockwise direction. This rotation of pivot lock mechanism 62 frees seat back 26 to pivot from a reclined position (illustrated in phantom lines) in a forward direction towards the front of vehicle seat assembly 20. As easy entry actuator 52 pivots clockwise, pin 64 moves along blocking member slot 66 thus causing blocking member 54 to pivot in a clockwise direction about blocking member pivot point 55. The pivoting of blocking member 54 in a clockwise direction about pivot point 55 moves blocking member 54 in a generally downward direction out of the path of engagement member 60. As illustrated in FIG. 4, with easy entry actuator 52 actuated, engagement member 60 is no longer obstructed by blocking member 54, and now passes above blocking member 54 thus allowing seat back 26 to pivot in a forward direction beyond predetermined point 38.

FIG. 5 illustrates the vehicle seat assembly 20 illustrated in FIG. 4 with seat back 26 pivoted forward to the forward edge of easy entry pivot range 34 (see FIG. 1). In this view, it can be seen that all of the slack has been taken out of slide lock mechanism cable 48. In operation, slide lock mechanism cable 48 pulls on slide lock mechanism 46 releasing it and allowing vehicle seat assembly 20 to slide along slide mount 44. Also depicted in FIG. 5 is the relationship between engagement member 60 and blocking member 54. Whereas prior to actuation of easy entry actuator 52, it was blocking member 54 that had obstructed the path of engagement member 60, now that easy entry actuator 52 has been actuated and seat back 26 has pivoted forward past the predetermined point, it is engagement member 60 that obstructs the path of blocking member 54 and prevents blocking member 54 from returning to the blocking position. With blocking member 54 precluded from pivoting upward back towards the blocking position, easy entry actuator 52 is precluded from returning to its unactuated state because of the engagement between blocking member slot 66 and pin 64. With easy entry actuator 52 precluded from returning to its unactuated state, pivot lock mechanism 62 is precluded from rotating back to its locked state, thus leaving seat back 26 free to pivot. In this manner, once a person has entered vehicle 22 behind vehicle seat assembly 20, he or she may simply pull back on seat back 26 without needing to trigger another actuator. In other embodiments, seat back 26 may lock into position when it reaches the forward edge of easy entry pivot range 42 and may require actuation of an additional actuator to release seat back 26 to pivot.

FIG. 6 illustrates the return of seat back 26 to a reclined position after the easy entry function of vehicle seat assembly 20 has been triggered. As seat back 26 moves rearward, engagement member 60 slides along an upper edge of blocking member 54. As soon as engagement member 60 passes a rear end of blocking member 54, blocking member 54 is free to pivot back into the blocking position. This is illustrated by an arrow showing the motion of blocking member 54. Phantom lines illustrate the position of blocking member 54 immediately prior to the movement of engagement member 60 beyond the rear edge of blocking member 54. Blocking member 54 returns automatically to the blocking position under the urging of easy entry actuator 52 which is biased towards a non-actuated state by easy entry actuator spring 58.

In FIG. 5, easy entry actuator spring 58 is under tension, urging easy entry actuator 52 to pivot in a counter clockwise direction which in turn causes pin 64 to urge blocking member 54 to pivot back towards the blocking position. Once engagement member 60 passes beyond a rearward end of blocking member 54, easy entry actuator spring 58 is able to pivot easy entry actuator 52 back to its unactuated state which, in turn, causes blocking member 54 to pivot back to the blocking position due to the engagement between blocking member slots 66 and pin 64. This action occurs as seat back 26 reclines rearward past predetermined point 38. Once easy entry actuator 52 is returned to the non-actuated state, pivot lock mechanism 62 returns to its locked state and now seat back 26 is precluded from reclining rearward beyond the predetermined point 38 until pivot lock mechanism 62 is unlocked such as through the use of handle 36 to adjust seat back 26 to a desired reclined position within first or comfort pivot range 32.

It may be desirable to delay the return of pivot lock mechanism 62 to its locked state until seat back 26 has pivoted rearward of predetermined point 38 by some desired amount.

Figure 7:
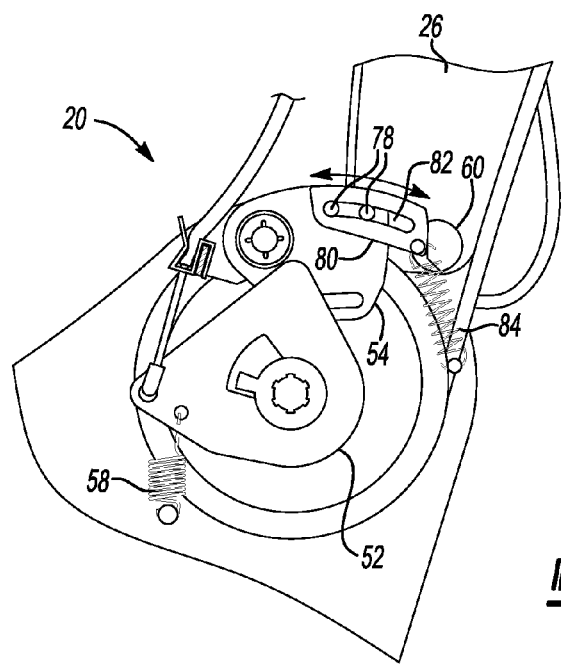
FIGS. 7-9 are fragmentary plan views of an outboard portion of the vehicle seat assembly of FIG. 1 depicting the components of an alternate embodiment of the pivot actuation mechanism of FIGS. 2-6 in various stages of actuation.
Figure 8:
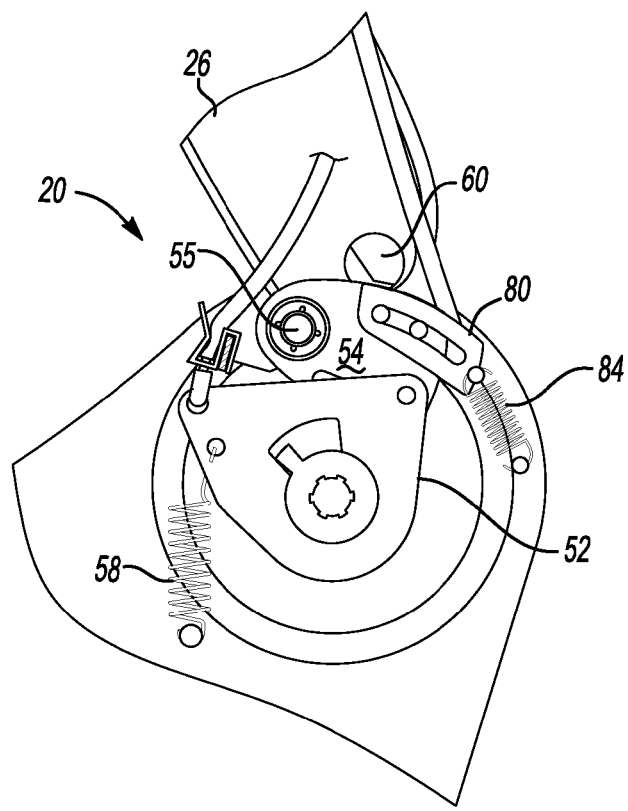
Figure 9:
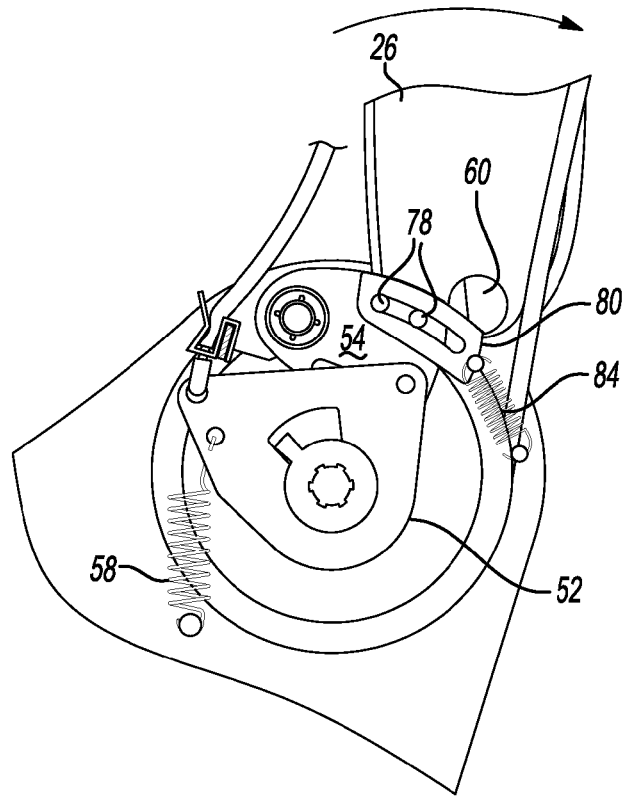

FIGS. 7-9 illustrate an alternate embodiment of pivot actuation mechanism 30 which delays the return of pivot lock mechanism 62 to the locked state until seat back 26 pivots rearward of predetermined point 38 by a predetermined amount. As illustrated in FIG. 7, blocking member 54 includes a pair of guide protrusions 78 protruding in an outboard direction from blocking member 54. A substantially flat retaining member 80 is disposed adjacent to blocking member 54. Retaining member 80 includes a retaining member slot 82 defined in an outboard surface of retaining member 80. Retaining member 80 is slidably mounted to blocking member 54 through engagement between retaining member slot 82 and guide protrusions 78. In the illustrated embodiment, guide protrusions 78 include two spaced apart pins mounted to an outboard side of blocking member 54 and extending in an outboard direction. By spacing the two pins apart, retaining member 80 is precluded from pivoting about either of the two guide protrusions 78. In other embodiments, guide protrusions 78 may include a single elongate member configured to fit within retaining member slot 82 and further configured to preclude retaining member 80 from pivoting.

Retaining member spring 84 is connected at one end to retaining member 80 and is connected at an opposite end to vehicle seat assembly 20. Retaining member 80 is configured to move between a retracted position and an extended position. Retaining member spring 84 biases retaining member 80 towards the extended position. When retaining member 80 is in the retracted position, a rear end of retaining member 80 is substantially aligned with a rear end of blocking member 54. When retaining member 80 is in the extended position, a rear portion of retaining member 80 extends beyond the rear end of blocking member 54. As seat back 26 pivots within the comfort pivot range 32, retaining member 80 is pressed against engagement member 60 under the urging of retaining member spring 84. Retaining member 80 slides back and forth as seat back 26 pivots forward and backwards.

FIG. 8 illustrates the vehicle seat assembly 20 of FIG. 7 subsequent to actuation of the easy entry function. Seat back 26 has pivoted forward to the forward edge of the easy entry pivot range 42, easy entry actuator 52 is illustrated in the actuated state, and blocking member 54 has pivoted about blocking member pivot point 55 out of the blocking position. As blocking member 54 pivots in the clockwise direction, the angle between retaining member 80 and retaining member spring 84 diminishes and retaining member spring 84 is able to pull retaining member 80 to the extended position. As illustrated, an upper edge of retaining member 80 is substantially aligned with an upper edge of blocking member 54, and thus configured to engage engagement member 60 together with blocking member 54.

As illustrated in FIG. 9, as seat back 26 pivots rearward, engagement member 60 moves rearward and engages an upper surface of blocking member 54 and an upper surface of retaining member 80. As seat back 26 passes predetermined point 38, engagement member 60 no longer contacts blocking member 54, but continues to engage the portion of retaining member 80 that extends beyond the rear edge of blocking member 54. Blocking member 54 is precluded from returning to the blocking position due to the engagement between guide protrusions 78 and retaining member 80. Once seat back 26 pivots to a second predetermined point (rearward of predetermined point 38) where engagement member 60 moves beyond a rear edge of retaining member 80, retaining member 80 comes out of engagement with engagement member 60 and then blocking member 54 returns to the blocking position and easy entry actuator 52 returns to its non-actuated state under the urging of easy entry actuator spring 58 and pivot lock mechanism 62 is free to return it its locked state.

Figure 10:
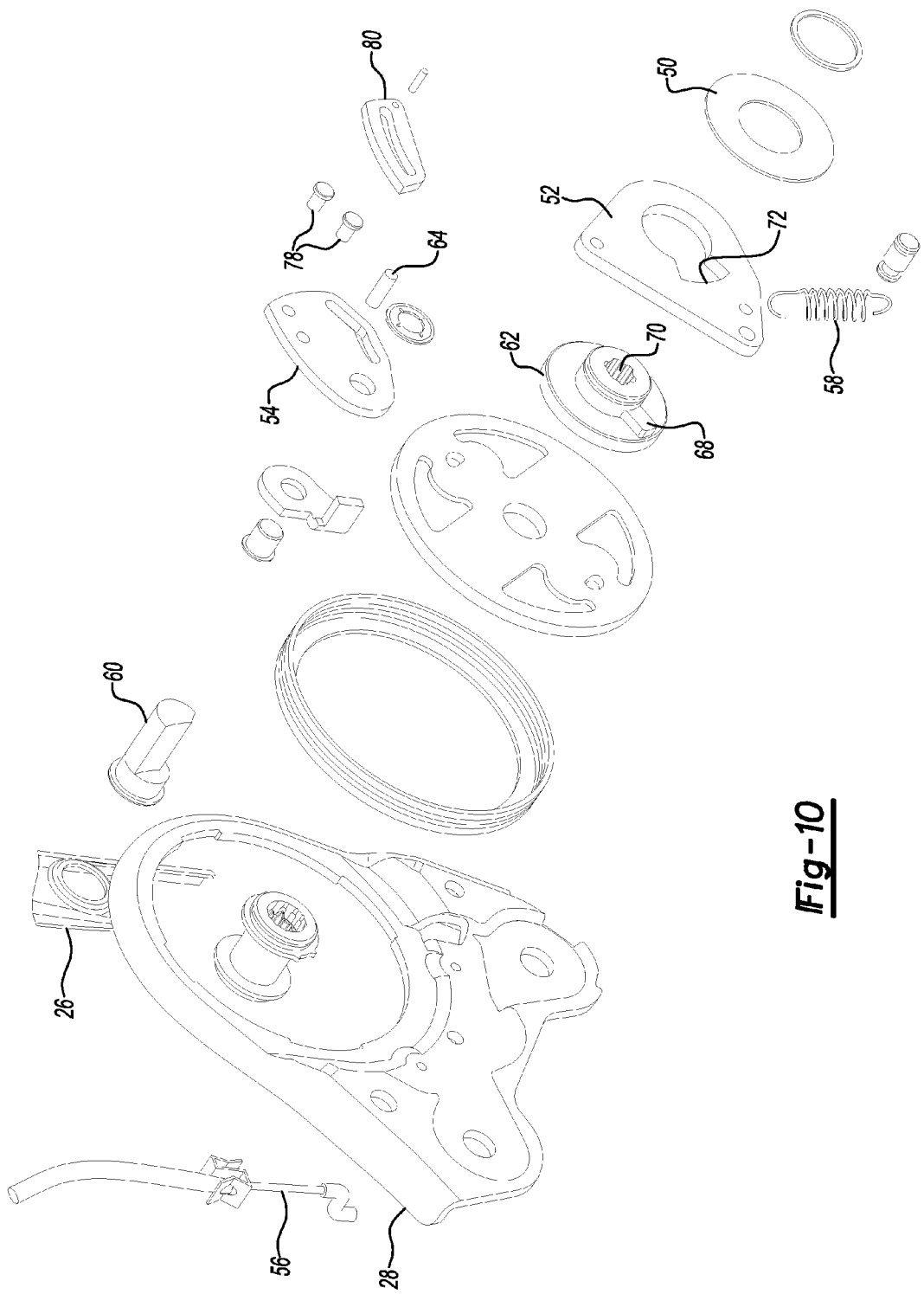
FIG. 10 is an exploded view depicting various components of the pivot actuation mechanism of FIGS. 7-9.

FIG. 10 is an exploded view illustrating the individual components of the pivot actuation mechanism 30 illustrated in FIGS. 7-9.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
    a seat body having a seat bottom and a seat back pivotally connected to the seat bottom, the seat back being configured to pivot through a first angular range that does not permit the seat back to actuate an easy entry function, and a second angular range that does permit the seat back to actuate the easy entry function;
    a first actuator for releasing the seat back to pivot through the first angular range;
    a second actuator for releasing the seat back to pivot through the second angular range, the second actuator having a protrusion; and
    a blocking member disposed on the seat body and configured to move between a first position in which the blocking member inhibits the seat back from pivoting forward beyond a predetermined point and a second position in which the seat back is free to pivot forward beyond the predetermined point, the blocking member having a slot;
    wherein the protrusion is disposed in and moves along the slot to move the blocking member from the first position to the second position when the second actuator is actuated.

2. The vehicle seat assembly of claim 1 wherein the first angular range is a subset of the second angular range.

3. The vehicle seat assembly of claim 2 wherein the second angular range has a forward limit that exceeds a forward limit of the first angular range.

4. The vehicle seat assembly of claim 1 further comprising a pair of rails for slidably mounting the seat body to a vehicle and a slide lock mechanism for selectively locking and unlocking the rails to slide, wherein the seat body is configured to release the slide lock mechanism from the locked state when the seat back pivots forward past a predetermined angular position with respect to the seat bottom and wherein the predetermined angular position is outside of the first angular range and within the second angular range.

5. The vehicle seat assembly of claim 4 wherein the seat body is further configured to permit the rails to return to the locked position when the seat back pivots rearward past the predetermined angular position.

6. The vehicle seat assembly of claim 4 wherein the seat body includes a retaining member that precludes the rails from returning to the locked state until the seat back pivots rearward beyond the predetermined angular position to a second predetermined angular position.

7. The vehicle seat assembly of claim 1 further comprising a switch disposed on the seat body at a location spaced apart from the second actuator, the switch being connected to the second actuator and being configured to remotely actuate the second actuator.

8. A vehicle seat assembly comprising:
a seat body having a seat bottom and a seat back configured to pivot with respect to the seat bottom, the seat body being configured to selectively lock and unlock pivot movement of the seat back;
a blocking member disposed proximate the seat body, the blocking member being configured to move between a first position that obstructs the seat back from pivoting in a forward direction beyond a predetermined point, and a second position that does not obstruct the seat back from pivoting in the forward direction;
a first actuator connected to the seat body and configured to unlock the seat back to pivot when actuated without moving the blocking member to the second position; and
a second actuator connected to seat body and to the blocking member, the second actuator configured to unlock the seat back to pivot and to move the blocking member to the second position when actuated;
wherein an easy entry function is triggered when the seat back pivots forward of the predetermined point, wherein the blocking member inhibits the seat back from pivoting forward beyond the predetermined point when the first actuator is actuated, and wherein the seat back is free to pivot forward beyond the predetermined point when the second actuator is actuated.

9. The vehicle seat assembly of claim 8 wherein a channel is defined in the blocking member and wherein the second actuator includes a protrusion protruding into the channel, the protrusion moving along the channel and pushing on a wall of the channel to move the blocking member from the first position to the second position when the second actuator is actuated.

10. The vehicle seat assembly of claim 9 wherein the second actuator includes a biasing member that urges the second actuator towards a non-actuated state and wherein the second actuator biases the blocking member towards the first position when the second actuator is in the non-actuated state through engagement between the protrusion and the channel.

11. The vehicle seat assembly of claim 10 wherein the blocking member is a first blocking member and the seat back includes a second blocking member, the first blocking member being configured to obstruct the second blocking member and to inhibit the seat back from pivoting forward beyond the predetermined point while the first blocking member is in the first position.

12. The vehicle assembly of claim 11 wherein the second blocking member obstructs the first blocking member from returning to the first position when the seat back pivots forward beyond the predetermined point and wherein the first blocking member retains the second actuator in an actuated state through engagement between the channel and the protrusion while the first blocking member is in the second position.

13. The vehicle seat assembly of claim 8 further comprising a pair of rails for slidably mounting the seat body to a vehicle and a slide lock mechanism for locking and unlocking the rails to slide, the seat body being configured to release the slide lock mechanism from the locked state when the seat back pivots forward past a slide lock trigger point which is at least as far forward as the predetermined point.

14. The vehicle seat assembly of claim 8 wherein the second actuator comprises a plate having a void to avoid obstructing operation of the first actuator when the first actuator unlocks the seat back to pivot.

15. A vehicle seat assembly comprising:
a seat bottom;
a seat back having an engagement member, the seat back being configured to pivot with respect to the seat bottom;
a blocking member configured to move between a first position that engages the engagement member to obstruct the seat back from pivoting in a forward direction beyond a predetermined point, and a second position that does not obstruct the seat back from pivoting in a forward direction;
a first actuator configured to unlock the seat back to permit the seat back to pivot without moving the blocking member to the second position;
a second actuator connected to the blocking member, the second actuator being configured to unlock the seat back to pivot and to move the blocking member to the second position when the second actuator is actuated and being further configured to remain in an actuated state until the blocking member returns to the first position; and
a retaining member connected to the blocking member, the retaining member being configured to move between an extended position and a retracted position, a portion of the retaining member extending in a rearward direction beyond a rear end of the blocking member when the retaining member is in the extended position and the retaining member being configured to engage the engagement member and to inhibit the blocking member from returning to the first position when the retaining member is in the extended position and engaged with the engagement member;
wherein the second actuator is retained in an actuated state until the engagement member moves beyond a rear end of the retaining member when the retaining member is in the extended position.

16. The vehicle seat assembly of claim 15 wherein the retaining member defines a slot and the blocking member comprises a protrusion slidably engaging the slot, the retaining member sliding along the protrusion as the retaining member moves between the extended position and the retracted position.

17. The vehicle seat assembly of claim 16 wherein the blocking member comprises two of the protrusions, the protrusions being spaced apart and cooperating to inhibit the retaining member from rotating with respect to the blocking member.

18. The vehicle seat assembly of claim 15 further comprising a retaining member spring connected to the retaining member, the retaining member spring biasing the retaining member towards the extended position.

19. The vehicle seat assembly of claim 18 further comprising a second actuator spring, the second actuator spring biasing the second actuator towards a non-actuated state.

20. The vehicle seat assembly of claim 15 wherein an easy entry function is actuated when the seat back pivots forward of the predetermined point, wherein the blocking member inhibits the seat back from pivoting forward beyond the predetermined point when the first actuator is actuated, and wherein the seat back is free to pivot forward beyond the predetermined point when the second actuator is actuated.

* * * * *